United States Patent

Michna et al.

[11] Patent Number: 4,514,188
[45] Date of Patent: Apr. 30, 1985

[54] USE OF DISAZO-COPPER COMPLEX DYESTUFFS FOR DYEING NATURAL AND SYNTHETIC MATERIALS

[75] Inventors: Martin Michna; Hermann Henk, both of Cologne, Fed. Rep. of Germany

[73] Assignee: Bayer Aktiengesellschaft, Leverkusen, Fed. Rep. of Germany

[21] Appl. No.: 538,686

[22] Filed: Oct. 3, 1983

[30] Foreign Application Priority Data

Oct. 26, 1982 [DE] Fed. Rep. of Germany ....... 3239509

[51] Int. Cl.³ .................. C09B 45/28; D06P 1/10; D21H 1/46
[52] U.S. Cl. ............................ 8/641; 8/437; 8/681; 8/685; 8/917; 8/918; 8/919; 8/924; 534/718; 534/719
[58] Field of Search .................... 8/681, 685, 641; 260/148

[56] References Cited

U.S. PATENT DOCUMENTS 2,620,331 12/1952 Wehru ........................ 260/148

FOREIGN PATENT DOCUMENTS 506981 5/1952 Belgium .
529889 12/1954 Belgium .
1161475 9/1958 France .
352956 7/1931 United Kingdom .

Primary Examiner—A. Lionel Clingman
Attorney, Agent, or Firm—Sprung Horn Kramer & Woods

[57] ABSTRACT

Use of mono-copper complexes of dyestuffs of the formula

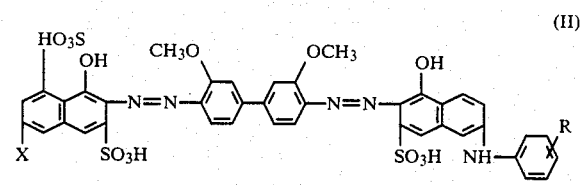

(II)

wherein
X is H or $SO_3H$ and
R is H, $C_1$–$C_4$-alkyl, $C_1$–$C_4$-alkoxy, carboxyl, halogen or sulpho, and of mixtures thereof with the bis-copper complexes of (II) in amounts of up to 50% by weight, for dyeing natural and synthetic materials, in particular cellulose materials, leather, wool and polyamide.

7 Claims, No Drawings

USE OF DISAZO-COPPER COMPLEX DYESTUFFS FOR DYEING NATURAL AND SYNTHETIC MATERIALS

The present invention relates to the use of the mono-copper complexes (I) of dyestuffs of the formula (II)

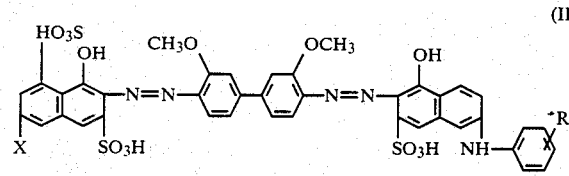

wherein
X is H or SO₃H and
R is H, $C_1$–$C_4$-alkyl, $C_1$–$C_4$-alkoxy, carboxyl, halogen or sulpho,
and of mixtures thereof with the bis-copper complexes (III) of the dyestuffs of the formula (II), for dyeing natural and synthetic materials, in particular fibre materials, preferably those of cellulose, such as cotton or paper, and leather, wool and polyamide, it being possible for the total mixtures to contain up to 50% by weight of (III).

Preferred mixtures contain 1–30% by weight, in particular 3–25% by weight, of (III), and consist of dyestuffs in which X has the same meaning.

The mono-copper complexes (I) and mixtures thereof with the bis-copper complexes (III) are obtained in a manner which is known per se, by coppering of the dyestuffs (II) which are prepared in the conventional manner, with copper-donating agents in amounts of 1–1.5 mols per mol of (II).

The dyestuffs give blue dyeings with good fastness properties on the abovementioned materials when used by the customary dyeing methods.

EXAMPLE 1

1 mol of the dyestuff II (X=H) is prepared in the conventional manner. A solution of 1.2 mols of copper sulphate pentahydrate, 350 ml of ethanolamine and 1.3 liters of water is added to the aqueous suspension obtained after the coupling reaction, and the mixture is heated at 100° C. for 4–10 hours. The resulting dyestuff mixture of (I) and (III) is salted out, filtered off and dried.

A dark blue powder is obtained, which gives navy blue dyeings with good fastness properties on cotton. Similarly good dyeings are obtained if 1.01 or 1.3 mols of copper sulphate pentahydrate are used.

EXAMPLE 2

A solution of 1.2 mols of copper sulphate pentahydrate, 350 ml of mono-ethanolamine and 1.5 liters of water is added to 1 mol of the dyestuff II (X=SO₃H), in aqueous suspension, as is obtained after the coupling reaction, and the mixture is heated at about 100° C. for 5–10 hours. The resulting mixture of dyestuffs (I) and (III) is salted out, filtered off and dried.

A dark blue powder is obtained, which gives navy blue dyeings with good fastness properties on cotton. Similarly good dyeings are obtained if 1.01 or 1.3 mols of copper sulphate pentahydrate are used.

We claim:

1. A process for dyeing cellulose fibre material wherein the dyestuff is a mono-copper complex (I) of a dyestuff of the formula II

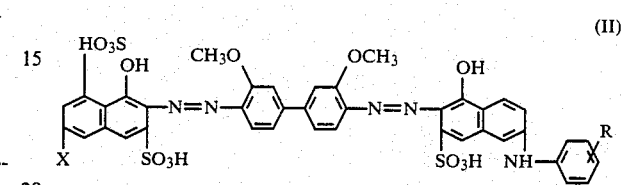

wherein
X is SO₃H and
R is H, $C_1$–$C_4$-alkyl, $C_1$–$C_4$-alkoxy, carboxyl, halogen or sulpho,
or of a mixture thereof with a bis-copper complex (III) of a dyestuff of the formula (II), wherein the total mixtures contain up to 50% by weight of (III).

2. Process according to claim 1, wherein said dyestuff mixture contain 1–30% by weight, of a bis-copper complex (III) of a dyestuff of the formula (II).

3. Process of claim 2 wherein the cellulose fibres are in the form of cotton or paper.

4. Process according to claim 2 wherein said dyestuff mixtures contains 3–25% by weight of a bis-copper complex (III) of a dyestuff of the formula (II).

5. A dyestuff mixture consisting of a mono-copper complex of a dyestuff of the formula II

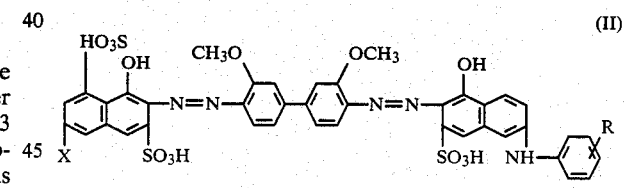

wherein
X is SO₃H and
R is H, $C_1$–$C_4$-alkyl, $C_1$–$C_4$-alkoxy, carboxyl, halogen or sulpho,
and a bis-copper complex (III) of a dyestuff of formula II, wherein the total mixtures contain up to 50% by weight of III.

6. A dyestuff mixture of claim 5 wherein the dyestuff mixture contains 1–30% by weight of dyestuff III.

7. A dyestuff mixture of claim 6 wherein the dyestuff mixture contains 3–25% by weight of dyestuff III.

* * * * *